United States Patent
Ueda

(10) Patent No.: US 12,034,614 B2
(45) Date of Patent: Jul. 9, 2024

(54) ANALYSIS APPARATUS, ANALYSIS METHOD, AND PROGRAM

(71) Applicant: NEC Corporation, Tokyo (JP)

(72) Inventor: Itaru Ueda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/924,138

(22) PCT Filed: May 20, 2020

(86) PCT No.: PCT/JP2020/019938
§ 371 (c)(1),
(2) Date: Nov. 9, 2022

(87) PCT Pub. No.: WO2021/234855
PCT Pub. Date: Nov. 25, 2021

(65) Prior Publication Data
US 2023/0179494 A1   Jun. 8, 2023

(51) Int. Cl.
*H04L 43/04* (2022.01)

(52) U.S. Cl.
CPC ................... *H04L 43/04* (2013.01)

(58) Field of Classification Search
CPC ....... H04L 43/04; H04L 41/042; H04L 41/14; G06F 13/00
USPC ...................................................... 709/224
See application file for complete search history.

(56) References Cited

U.S. PATENT DOCUMENTS

| | | | |
|---|---|---|---|
| 2013/0019279 A1 | 1/2013 | Aida | |
| 2014/0047085 A1* | 2/2014 | Peters | G06Q 30/06 709/221 |
| 2016/0119279 A1* | 4/2016 | Maslak | H04L 67/1004 |
| 2018/0131748 A1* | 5/2018 | Gero | H04L 67/568 |
| 2020/0186980 A1 | 6/2020 | Furuyama et al. | |
| 2021/0273864 A1 | 9/2021 | Ashino et al. | |

FOREIGN PATENT DOCUMENTS

| | | | | |
|---|---|---|---|---|
| CN | 111385157 A | * | 7/2020 | ......... H04L 41/0654 |
| JP | 2013-021632 A | | 1/2013 | |
| JP | 2019-041179 A | | 3/2019 | |
| JP | 2019-075765 A | | 5/2019 | |
| WO | 2020/017404 A1 | | 1/2020 | |

OTHER PUBLICATIONS

Written opinion for PCT Application No. PCT/JP2020/019938, dated Sep. 1, 2020 with English translation.
International Search Report for PCT Application No. PCT/JP2020/019938, dated Sep. 1, 2020.
Written opinion for PCT Application No. PCT/JP2020/019938, dated Sep. 1, 2020.

* cited by examiner

*Primary Examiner* — Tan Doan

(57) ABSTRACT

A status of a delivery system provided with a plurality of delivery servers is appropriately analyzed. An analysis apparatus includes a delivery data acquisition section 235 configured to acquire multiple pieces of delivery data delivered by a plurality of delivery servers provided in a delivery system and an analysis processing section 237 configured to perform analysis processing by comparing the multiple pieces of delivery data acquired by the delivery data acquisition section 235.

15 Claims, 13 Drawing Sheets

| CL ID | CL PORT NUMBER | CONNECTION DESTINATION | CONNECTION DESTINATION PORT NUMBER | REQUEST CONTENT | EXPECTED DIFFERENCE |
|---|---|---|---|---|---|
| #0 | 33333 | 4.3.2.1 | 80 | GET / | - |
| #1 | 33334 | abc.com | 443 | GET / | NONE |
| #2 | 33335 | 5.6.7.8 | 443 | GET / | APPLICABLE |
| #3 | 33336 | 3.5.7.9 | 80 | GET / | NONE |

Fig. 8

| CL ID | CL IP ADDRESS | CL COUNTRY/REGION | CL PORT NUMBER | CONNECTION DESTINATION | CONNECTION DESTINATION COUNTRY/REGION | CONNECTION DESTINATION PORT NUMBER | ORIGIN SERVER IP | REQUEST CONTENT | REQUEST SENDING TIME | EXPECTED DIFFERENCE |
|---|---|---|---|---|---|---|---|---|---|---|
| #0 | 10.20.30.40 | JAPAN | 33333 | 4.3.2.1 | JAPAN | 80 | ... | GET / | 2020/1/1 00:00:00 | ... |
| #1 | 11.21.31.41 | FRANCE | 33334 | aaa.com | ... | 443 | 4.3.2.1 | GET / | 2020/1/1 00:00:00 | NONE |
| #2 | 12.22.32.42 | UNITED STATE | 33335 | 5.6.7.8 | RUSSIA | 443 | 4.3.2.1 | GET / | 2020/1/1 00:00:00 | APPLICABLE |
| #3 | 13.23.33.43 | ENGLAND | 33336 | 3.5.7.9 | AUSTRALIA | 80 | 4.3.2.1 | GET / | 2020/1/1 00:00:00 | NONE |

Fig. 9 a.html

```
<!DOCTYPE html>
<html lang="ja" class="no-js no-svg">
<head>
<meta charset="UTF-8">
...
...
</head>
<body>
...
...
...
...
</body>
</html>
```

Fig. 10

| CL ID | CL IP ADDRESS | CL COUNTRY/REGION | CL PORT NUMBER | CONNECTION DESTINATION | CONNECTION DESTINATION COUNTRY/REGION | CONNECTION DESTINATION PORT NUMBER | ORIGIN SERVER IP | REQUEST CONTENT | REQUEST SENDING TIME | EXPECTED DIFFERENCE | DELIVERY DATA |
|---|---|---|---|---|---|---|---|---|---|---|---|
| #0 | 10.20.30.40 | JAPAN | 33333 | 4.3.2.1 | JAPAN | 80 | - | GET / | 2020/1/1 00:00:00 | - | a.html |
| #1 | 11.21.31.41 | FRANCE | 33334 | abc.com 2.4.6.8 | CHINA | 443 | 4.3.2.1 | GET / | 2020/1/1 00:00:00 | NONE | a1.html |
| #2 | 12.22.32.42 | UNITED STATE | 33335 | 5.6.7.8 | RUSSIA | 443 | 4.3.2.1 | GET / | 2020/1/1 00:00:00 | APPLICABLE | a2.html |
| #3 | 13.23.33.43 | ENGLAND | 33336 | 5.6.7.9 | AUSTRALIA | 80 | 4.3.2.1 | GET / | 2020/1/1 00:00:00 | NONE | a3.html |

Fig. 11

| G.IP ADDRESS | CL. COUNTRY REGION | CL. PORT NUMBER | CONNECTION DESTINATION | CONNECTION DESTINATION COUNTRY/REGION | CONNECTION DESTINATION PORT NUMBER | SENSOR SIGNATURE | REQUEST CONTENT | REQUEST SENDING TIME | EXPECTED DIFFERENCE | DELIVERY DATE | ACTUAL DIFFERENCE | STATUS INFORMATION |
|---|---|---|---|---|---|---|---|---|---|---|---|---|
| #0 | 10.20.30.40 | JAPAN | 33333 | 4.3.2.1 | JAPAN | 80 | - | - | GET / | 2020/4/1 03:00:00 | - | a.html | - | - |
| #1 | 11.21.31.41 | FRANCE | 33334 | abc.com 2.4.6.8 | CHINA | 443 | 4.3.2.1 | GET / | 2020/4/1 02:00:00 | NONE | a1.html | NONE | NORMAL |
| #2 | 12.22.32.42 | UNITED STATE | 33335 | 5.6.7.8 | RUSSIA | 443 | 4.3.2.1 | GET / | 2020/4/1 03:00:00 | APPLICABLE | a2.html | APPLICABLE | NORMAL |
| #3 | 13.23.33.43 | ENGLAND | 33336 | 3.5.7.9 | AUSTRALIA | 80 | 4.3.2.1 | GET / | 2020/4/1 03:00:00 | NONE | a3.html | APPLICABLE | ABNORMAL |

Fig. 12

ANALYSIS APPARATUS, ANALYSIS METHOD, AND PROGRAM

This application is a National Stage Entry of PCT/JP2020/019938 filed on May 20, 2020, the contents of all of which are incorporated herein by reference, in their entirety.

BACKGROUND

Technical Field

The present invention relates to an analysis apparatus, an analysis method, and a program.

Background Art

Data delivery via the Internet being a global network connecting a large number of computer networks to each other has been utilized. In general, a delivery apparatus delivers data in response to a request from a user.

In data delivery via the Internet as described above, data that matches the intent of a deliverer needs to be delivered from the delivery apparatus to a client who has sent the request. In recent years, various techniques for analyzing a response from an apparatus for a request have been proposed.

For example, PTL 1 discloses a technique for analyzing a node that provides a service on a network. In the above technique, first, a plurality of first nodes send a request to a certain second node to be analyzed. The second node sends responses to the received requests to the respective first nodes. A communication analysis apparatus analyzes the response sent from each of the first nodes and outputs the results.

CITATION LIST

Patent Literature

[PTL 1] WO 2020/017404

SUMMARY

Technical Problem

The technique disclosed in PTL 1 is a technique for analyzing a status of a single delivery server (second node). The technique disclosed in PTL 1 is not for analyzing a status of a delivery system provided with a plurality of delivery servers.

In recent years, a technique for delivering data using a delivery system, such as a content delivery network (CDN), which is provided with a plurality of delivery servers, has been proposed. Thus, there has been a demand for development of an analysis technique related to a status of the delivery system as described above.

An example object of the present invention is to provide an analysis apparatus, an analysis method, and a program that enable appropriate analysis of a status of a delivery system provided with a plurality of delivery servers.

Solution to Problem

An analysis apparatus according to an aspect of the present invention includes: a delivery data acquisition section configured to acquire multiple pieces of delivery data delivered by a plurality of delivery servers provided in a delivery system; and an analysis processing section configured to perform analysis processing by comparing the multiple pieces of delivery data acquired by the delivery data acquisition section.

An analysis method according to an aspect of the present invention includes: acquiring multiple pieces of delivery data delivered by a plurality of delivery servers provided in a delivery system; and performing analysis processing by comparing the multiple pieces of delivery data acquired.

A program according to an aspect of the present invention causes a computer to operate as: a delivery data acquisition section configured to acquire multiple pieces of delivery data delivered by a plurality of delivery servers provided in a delivery system; and an analysis processing section configured to perform analysis processing by comparing the multiple pieces of delivery data acquired by the delivery data acquisition section.

Advantageous Effects of Invention

According to the present invention, a status of a delivery system provided with a plurality of delivery servers can be appropriately analyzed. Note that, according to the present invention, instead of or together with the above effects, other effects may be exerted.

BRIEF DESCRIPTION OF THE DRAWINGS

FIG. 8 is an explanatory diagram illustrating instruction data according to the first example embodiment of the present invention;

FIG. 9 is an explanatory diagram illustrating request control data according to the first example embodiment of the present invention;

FIG. 10 is an explanatory diagram illustrating delivery data according to the first example embodiment of the present invention;

FIG. 11 is an explanatory diagram illustrating data accumulated in the database apparatus 400 according to the first example embodiment of the present invention;

FIG. 12 is an explanatory diagram illustrating a result of the analysis processing according to the first example embodiment of the present invention.

DESCRIPTION OF THE EXAMPLE EMBODIMENTS

Figure 1:
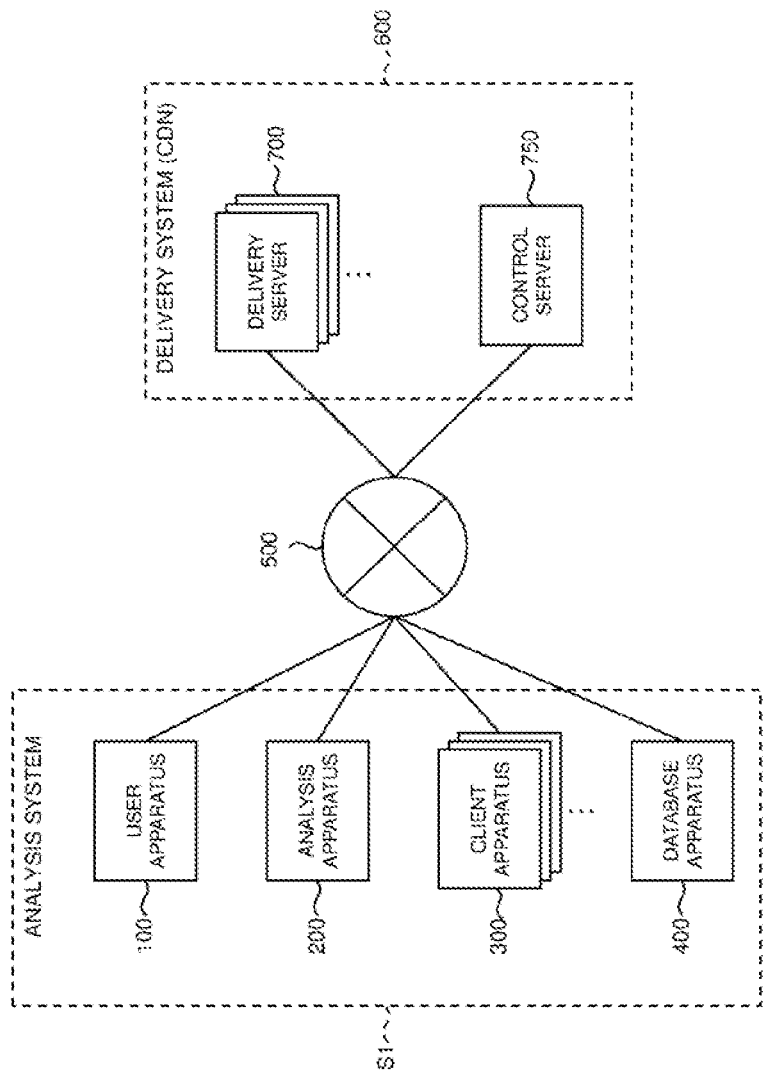
FIG. 1 is an explanatory diagram illustrating a schematic configuration of a system S1 according to a first example embodiment of the present invention.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Each example embodiment described below is merely an example of a configuration that can implement the present invention. Each example embodiment described below can be appropriately modified or changed according to a configuration of an apparatus to which the present invention is applied and various conditions. All of combinations of elements included in each example embodiment described below are not necessarily required to implement the present invention, and a part of the elements can be appropriately omitted. Hence, the scope of the present invention is not limited by configurations described in each example embodiment described below. Configurations in which a plurality of configurations described in the example embodiments are combined can also be adopted unless the configurations are consistent with each other.

Descriptions According to the Present Invention Will be Given in the Following Order.
1. Overview of Example Embodiments of Present Invention
2. First Example Embodiment
   2.1. Configuration of User Apparatus 100
   2.2. Configuration of Analysis Apparatus 200
   2.3. Configuration of Client Apparatus 300
   2.4. Configuration of Database Apparatus 400
   2.5. Configuration of CDN 600
   2.6. Operation Example
   2.7. Example Alterations
3. Second Example Embodiment
   3.1. Configuration of Analysis Apparatus 200a
   3.2. Operation Example
4. Other Example Embodiments

1. Overview of Example Embodiments of Present Invention

First, an overview of example embodiments of the present invention will be described.

(1) Technical Issue

Data delivery via the Internet being a global network connecting a large number of computer networks to each other has been utilized. In general, a delivery apparatus delivers data in response to a request from a user. In data delivery via the Internet as described above, data that matches the intent of a deliverer needs to be delivered from the delivery apparatus to a client who has sent the request.

In recent years, a technique for delivering data using a delivery system, such as a content delivery network (CDN), which is provided with a plurality of delivery servers, has been proposed. Thus, there has been a demand for development of an analysis technique related to a status of the delivery system as described above.

In view of the circumstances described above, the present example embodiment has an example object to appropriately analyze a status of a delivery system provided with a plurality of delivery servers.

(2) Technical Features

In the example embodiments of the present invention, multiple pieces of delivery data delivered by a plurality of delivery servers provided in a delivery system are acquired, and analysis processing is performed by comparing the multiple pieces of delivery data acquired.

According to the configuration described above, a status of the delivery system provided with the plurality of delivery servers can be appropriately analyzed. Note that, according to the present example embodiment, instead of or together with the above effects, other effects may be exerted. Note that the technical features described above are merely a specific example of the example embodiments of the present invention, and as a matter of course, the example embodiments of the present invention are not limited to the technical features described above.

2. First Example Embodiment

Next, with reference to FIG. 1 to FIG. 12, a first example embodiment of the present invention will be described. FIG. 1 is an explanatory diagram illustrating a schematic configuration of an analysis system S1 according to the first example embodiment of the present invention. As illustrated in FIG. 1, the analysis system S1 according to the present example embodiment includes a user apparatus 100, an analysis apparatus 200, a plurality of client apparatuses 300, and a database apparatus 400. The user apparatus 100, the analysis apparatus 200, the plurality of client apparatuses 300, and the database apparatus 400 can communicate with each other via a network 500.

The plurality of client apparatuses 300 can access a CDN 600 via the network 500 under control by the analysis apparatus 200. The CDN 600 is a delivery system including a plurality of delivery servers 700 and a control server 750.

Generally, based on an instruction from the user apparatus 100, the analysis apparatus 200 controls the plurality of client apparatuses 300 to cause the plurality of client apparatuses 300 to access the CDN 600. The plurality of client apparatuses 300 accumulate delivery data received from the CDN 600 in the database apparatus 400. The analysis apparatus 200 performs analysis processing by using the delivery data accumulated in the database apparatus 400 and outputs to the user apparatus 100.

The analysis system S1 according to the present example embodiment is a system including a plurality of nodes that communicate in accordance with a predetermined internet protocol suite (for example, the Transmission Control Protocol/the Internet Protocol, TCP/IP). Note that the analysis system S1 may be a system conforming to another standard.

2.1. Configuration of User Apparatus 100

Figure 2:
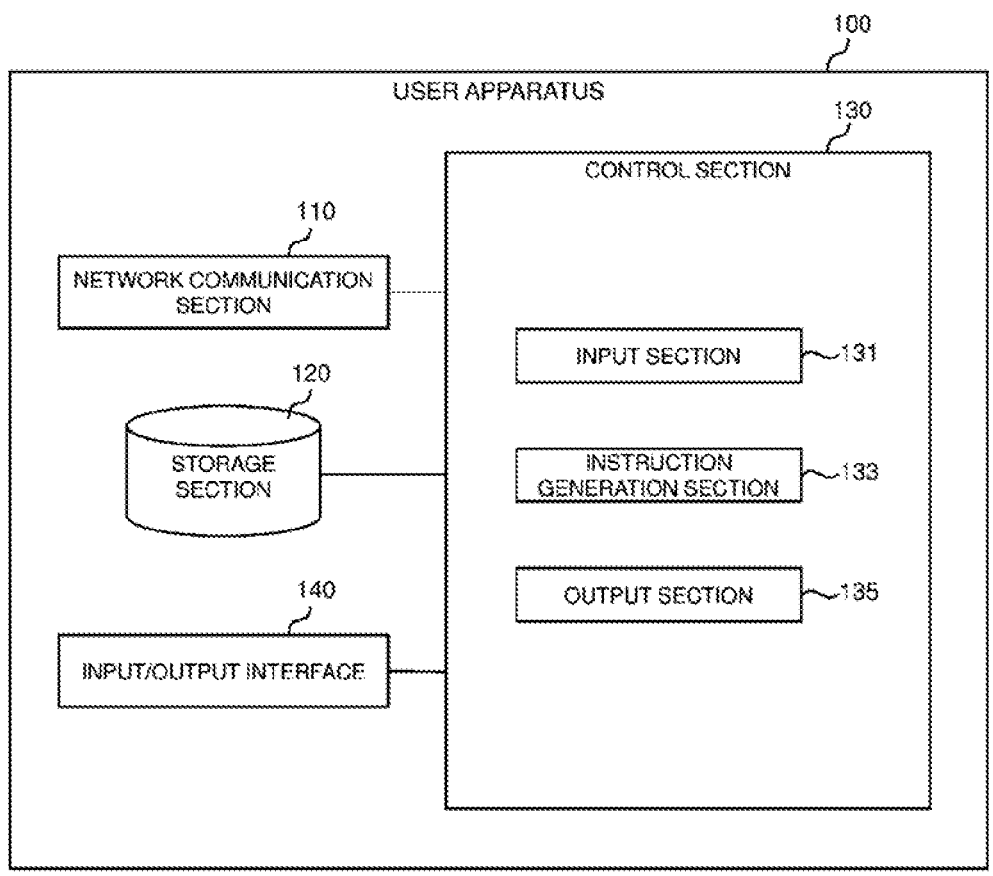
FIG. 2 is a block diagram illustrating a schematic configuration of a user apparatus 100 according to the first example embodiment of the present invention.

The user apparatus 100 according to the present example embodiment is an apparatus that receives an input from a user and supplies the input to the analysis apparatus 200, and receives an output from the analysis apparatus 200 and presents the output to the user. FIG. 2 is a block diagram illustrating a schematic configuration of the user apparatus 100. As illustrated in FIG. 2, the user apparatus 100 includes a network communication section 110, a storage section 120, a control section 130, and an input/output interface (I/F) 140.

The network communication section 110 is an element that sends and receives a signal to and from another apparatus (for example, the analysis apparatus 200) via the network 500. The network communication section 110 can be implemented by a network adapter and/or a network interface card (NIC), for example.

The storage section 120 is an element that temporarily or permanently stores a program (instructions) and pieces of data used to perform various types of processing in the user apparatus 100. The program includes one or more instructions for operations of the user apparatus 100. The storage section 120 can be, for example, implemented by a storage medium such as a volatile memory, a non-volatile memory, or a magnetic disk, or a combination of at least two of these. The storage section 120 may be integrally configured with one or more processors constituting the control section 130.

The control section 130 is an element that provides various functions of the user apparatus 100, and includes, as its functional blocks, an input section 131, an instruction generation section 133, and an output section 135. Note that the control section 130 may further include components other than the functional blocks described above. In other words, the control section 130 can perform operations other than the operations of the functional blocks described above.

The control section 130 can be implemented by one or more processors, for example. The control section 130 may deploy, in the storage section 120 and/or a system memory (not illustrated), the program stored in the storage section 120 and execute the program, to thereby implement processing according to the present example embodiment to be described later. Note that each functional block (the input section 131, the instruction generation section 133, and the output section 135) may be implemented by one or more processors different from those for the control section 130.

The input/output I/F 140 is an interface between an input device such as a keyboard and a mouse and an output device such as a liquid crystal display, and the user apparatus 100. The input/output I/F 140 converts an input signal corresponding to a user operation for the input device into input data and supplies the input data to the control section 130, and converts output data supplied from the control section 130 into an output signal and sends the output signal to the output device.

The input data supplied from the input/output I/F 140 is transferred to the instruction generation section 133 via the input section 131. Operations of the instruction generation section 133 will be described later. The output section 135 processes the data sent from the analysis apparatus 200, and supplies the processed data to the input/output I/F 140 as the output data.

2.2. Configuration of Analysis Apparatus 200

Figure 3:
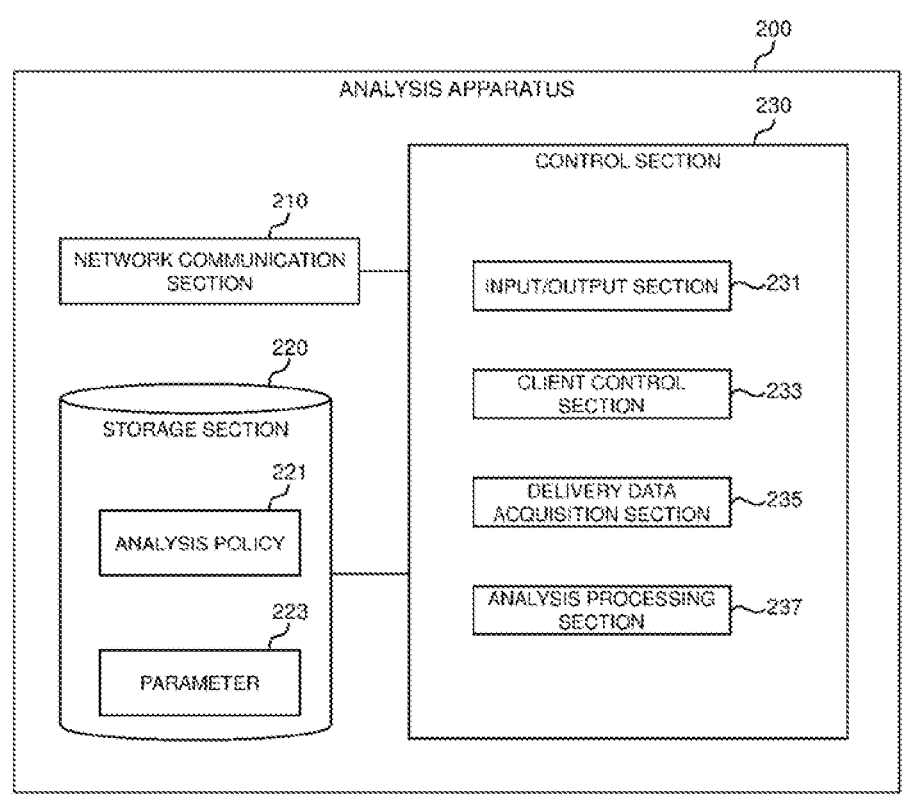
FIG. 3 is a block diagram illustrating a schematic configuration of an analysis apparatus 200 according to the first example embodiment of the present invention.

The analysis apparatus 200 according to the present example embodiment is an apparatus that controls the client apparatuses 300 to acquire delivery data from the CDN 600, and performs analysis processing by using the acquired delivery data. FIG. 3 is a block diagram illustrating a schematic configuration of the analysis apparatus 200. As illustrated in FIG. 3, the analysis apparatus 200 includes a network communication section 210, a storage section 220, and a control section 230.

The network communication section 210 is an element that sends and receives a signal to and from another apparatus (for example, the user apparatus 100, the client apparatuses 300, and the database apparatus 400) via the network 500. The network communication section 210 can be implemented by a network adapter and/or a network interface card, for example.

The storage section 220 is an element that temporarily or permanently stores a program (instructions) and pieces of data used to perform various types of processing in the analysis apparatus 200. The program includes one or more instructions for operations of the analysis apparatus 200. The storage section 220 can be, for example, implemented by a storage medium such as a volatile memory, a non-volatile memory, or a magnetic disk, or a combination of at least two of these. The storage section 220 may be integrally configured with one or more processors constituting the control section 230.

The storage section 220 further stores an analysis policy 221 and a parameter 223 that are used for the analysis processing according to the present example embodiment to be described later. The analysis policy 221 and the parameter 223 will be described later. Note that the parameter 223 may include, for example, an Internet Protocol (IP) address of each client apparatus 300, a country/region inferred based on a range of the IP address, and an IP address of each delivery server 700 in the CDN 600.

The control section 230 is an element that provides various functions of the analysis apparatus 200, and includes, as its functional blocks, an input/output section 231, a client control section 233, a delivery data acquisition section 235, and an analysis processing section 237. Note that the control section 230 may further include components other than the functional blocks described above. In other words, the control section 230 can perform operations other than the operations of the functional blocks described above.

The control section 230 can be implemented by one or more processors, for example. The control section 230 may deploy, in the storage section 220 and/or a system memory (not illustrated), the program stored in the storage section 220 and execute the program, to thereby implement processing according to the present example embodiment to be described later. Note that each functional block (the input/output section 231, the client control section 233, the delivery data acquisition section 235, and the analysis processing section 237) may be implemented by one or more processors different from those for the control section 230.

Although each functional block will be described later, an outline is given below. The input/output section 231 processes data input to the analysis apparatus 200 and data to be output from the analysis apparatus 200. The client control section 233 controls the plurality of client apparatuses 300 to cause the plurality of client apparatuses 300 to acquire multiple pieces of delivery data from the plurality of delivery servers 700. The delivery data acquisition section 235 acquires the pieces of delivery data delivered by the delivery servers 700 from the database apparatus 400. The analysis processing section 237 performs the analysis processing according to the analysis policy 221 specifying items to be compared in the analysis processing. The analysis processing section 237 outputs status information indicating a status of at least one delivery server 700 to the user apparatus 100, based on a result of the analysis processing.

2.3. Configuration of Client Apparatus 300

Figure 4:
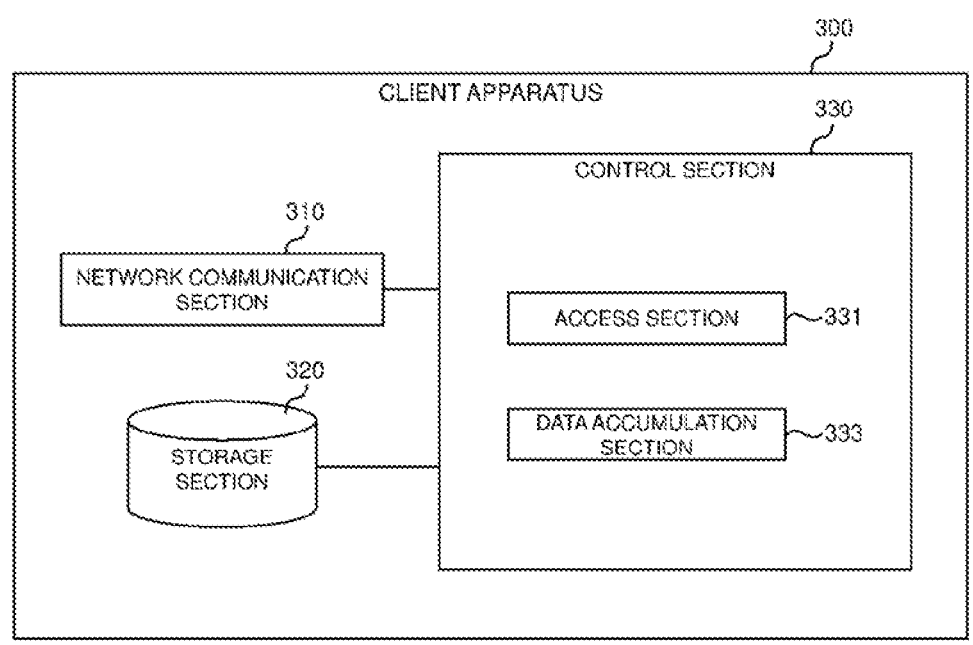
FIG. 4 is a block diagram illustrating a schematic configuration of a client apparatus 300 according to the first example embodiment of the present invention.

The plurality of client apparatuses 300 according to the present example embodiment access the CDN 600, based on control from the analysis apparatus 200, and accumulate received delivery data in the database apparatus 400. The plurality of client apparatuses 300 included in the analysis system S1 are similarly configured, and thus one client apparatus 300 will be described below as a typical example thereof. FIG. 4 is a block diagram illustrating a schematic configuration of the client apparatus 300.

As illustrated in FIG. 4, the client apparatus 300 includes a network communication section 310, a storage section 320, and a control section 330. The client apparatus 300 is allocated a global IP address.

The network communication section 310 is an element that sends and receives a signal to and from another apparatus (for example, the analysis apparatus 200, the database apparatus 400, and the delivery servers 700) via the network 500. The network communication section 310 can be implemented by a network adapter and/or a network interface card, for example.

The storage section 320 is an element that temporarily or permanently stores a program (instructions) and pieces of data used to perform various types of processing in the client apparatus 300. The program includes one or more instructions for operations of the client apparatus 300. The storage section 320 can be, for example, implemented by a storage medium such as a volatile memory, a non-volatile memory, or a magnetic disk, or a combination of at least two of these. The storage section 320 may be integrally configured with one or more processors constituting the control section 330.

The control section 330 is an element that provides various functions of the client apparatus 300, and includes, as its functional blocks, an access section 331 and a data accumulation section 333. Note that the control section 330 may further include components other than the functional blocks described above. In other words, the control section 330 can perform operations other than the operations of the functional blocks described above.

The control section 330 can be implemented by one or more processors, for example. The control section 330 may deploy, in the storage section 320 and/or a system memory (not illustrated), the program stored in the storage section 320 and execute the program, to thereby implement processing according to the present example embodiment to be described later. Note that each functional block (the access section 331 and the data accumulation section 333) may be implemented by one or more processors different from those for the control section 330.

2.4. Configuration of Database Apparatus 400

Figure 5:
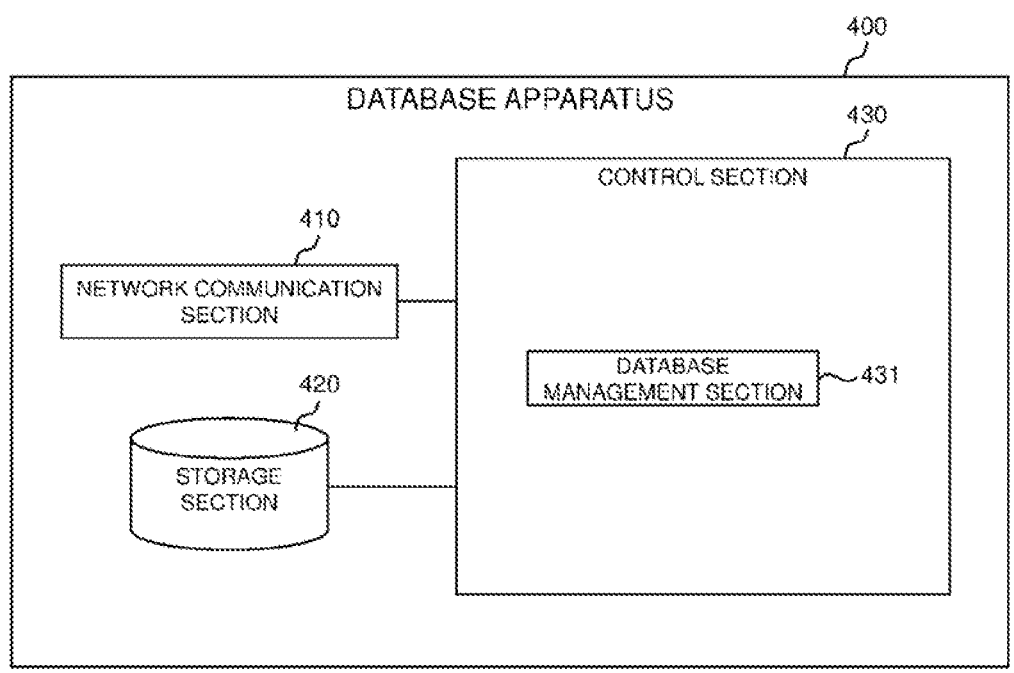
FIG. 5 is a block diagram illustrating a schematic configuration of a database apparatus 400 according to the first example embodiment of the present invention.

The database apparatus 400 according to the present example embodiment is an apparatus that accumulates pieces of delivery data supplied from the plurality of client apparatuses 300. FIG. 5 is a block diagram illustrating a schematic configuration of the database apparatus 400.

As illustrated in FIG. 5, the database apparatus 400 includes a network communication section 410, a storage section 420, and a control section 430.

The network communication section 410 is an element that sends and receives a signal to and from another apparatus (for example, the analysis apparatus 200 and the client apparatuses 300) via the network 500. The network communication section 410 can be implemented by a network adapter and/or a network interface card, for example.

The storage section 420 is an element that temporarily or permanently stores a program (instructions) and pieces of data used to perform various types of processing in the database apparatus 400. The program includes one or more instructions for operations of the database apparatus 400. The storage section 420 can be, for example, implemented by a storage medium such as a volatile memory, a non-volatile memory, or a magnetic disk, or a combination of at least two of these. The storage section 420 may be integrally configured with one or more processors constituting the control section 430.

The control section 430 is an element that provides various functions of the database apparatus 400, and includes, as its functional block, a database management section 431. The database management section 431 is a so-called database management system (DBMS), and can operate together with the storage section 420 to implement a relational database (RDB). Note that the control section 430 may further include components other than the functional blocks described above. In other words, the control section 430 can perform operations other than the operations of the functional blocks described above.

The control section 430 can be implemented by one or more processors, for example. The control section 430 may deploy, in the storage section 420 and/or a system memory (not illustrated), the program stored in the storage section 420 and execute the program, to thereby implement processing according to the present example embodiment to be described later. Note that each functional block (the database management section 431) may be implemented by one or more processors different from those for the control section 430.

Note that the database apparatus 400 may be configured as a part of the analysis apparatus 200. For example, the control section 230 may include a functional block corresponding to the database management section 431, and the functional block may operate together with the storage section 220 to implement a relational database according to the present example embodiment.

2.5. Configuration of CDN 600

Figure 6:
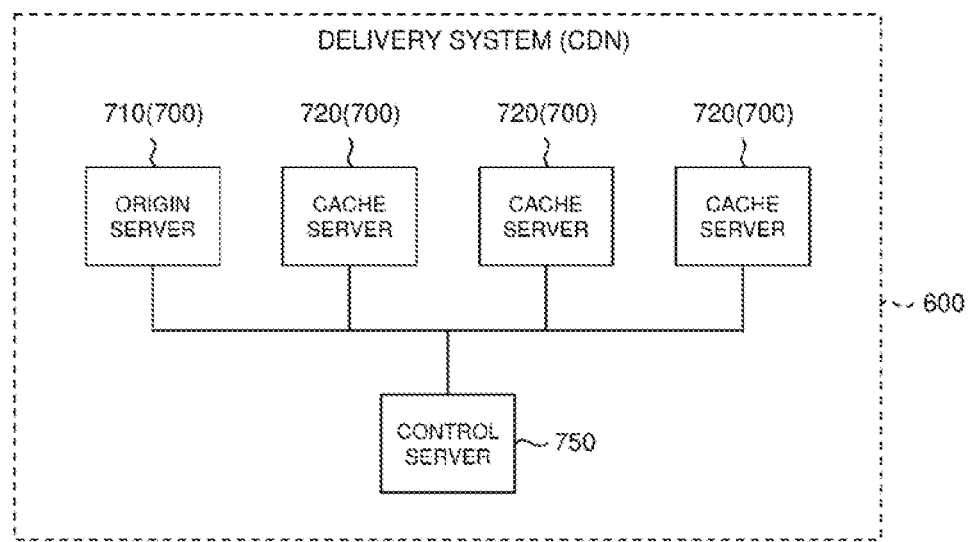
FIG. 6 is an explanatory diagram illustrating a schematic configuration of a CDN 600 according to the first example embodiment of the present invention.

The CDN 600 being a delivery system according to the present example embodiment includes the plurality of delivery servers 700, and the control server 750 that controls the delivery servers 700. FIG. 6 is an explanatory diagram illustrating a schematic configuration of the CDN 600. The plurality of delivery servers 700 include, for example, at least one origin server 710 that delivers original delivery data, and at least one cache server 720 that caches delivery data delivered by the origin server 710. Typically, as illustrated in FIG. 6, the CDN 600 includes one origin server 710 and a plurality of cache servers 720. Note that the plurality of delivery servers 700 logically configure one CDN 600 but can physically be installed in any place. For example, five delivery servers 700 may be respectively deployed in Japan, Korea, China, Europe, and the United States.

Each delivery server 700 sends delivery data in response to a request from the client apparatus 300 (access section 331). When the client apparatus 300 attempts access using a domain name, an access destination of the client apparatus 300 is assigned based on name resolution using a domain name server (DNS) (not illustrated). In contrast, when the client apparatus 300 attempts access using an IP address, an access destination of the client apparatus 300 is directly identified by the IP address.

Each cache server 720 caches delivery data delivered by the origin server 710. Thus, when the origin server 710 and the plurality of cache servers 720 appropriately synchronize with each other, each client apparatus 300 (access section 331) can acquire the same delivery data no matter which delivery server 700 (origin server 710 and cache server(s) 720) the client apparatus 300 (access section 331) accesses.

The control server 750 performs synchronization check for determining whether the origin server 710 and each cache server 720 synchronize with each other. The synchronization check above may be executed once every predetermined period of time, for example. The control server 750 controls the cache server 720 that is determined not to synchronize with the origin server 710, such that the cache server 720 synchronizes with the origin server 710. Note that one (for example, the origin server 710) of the plurality of delivery servers 700 may have the function of the control server 750.

2.6. Operation Example

Figure 7:
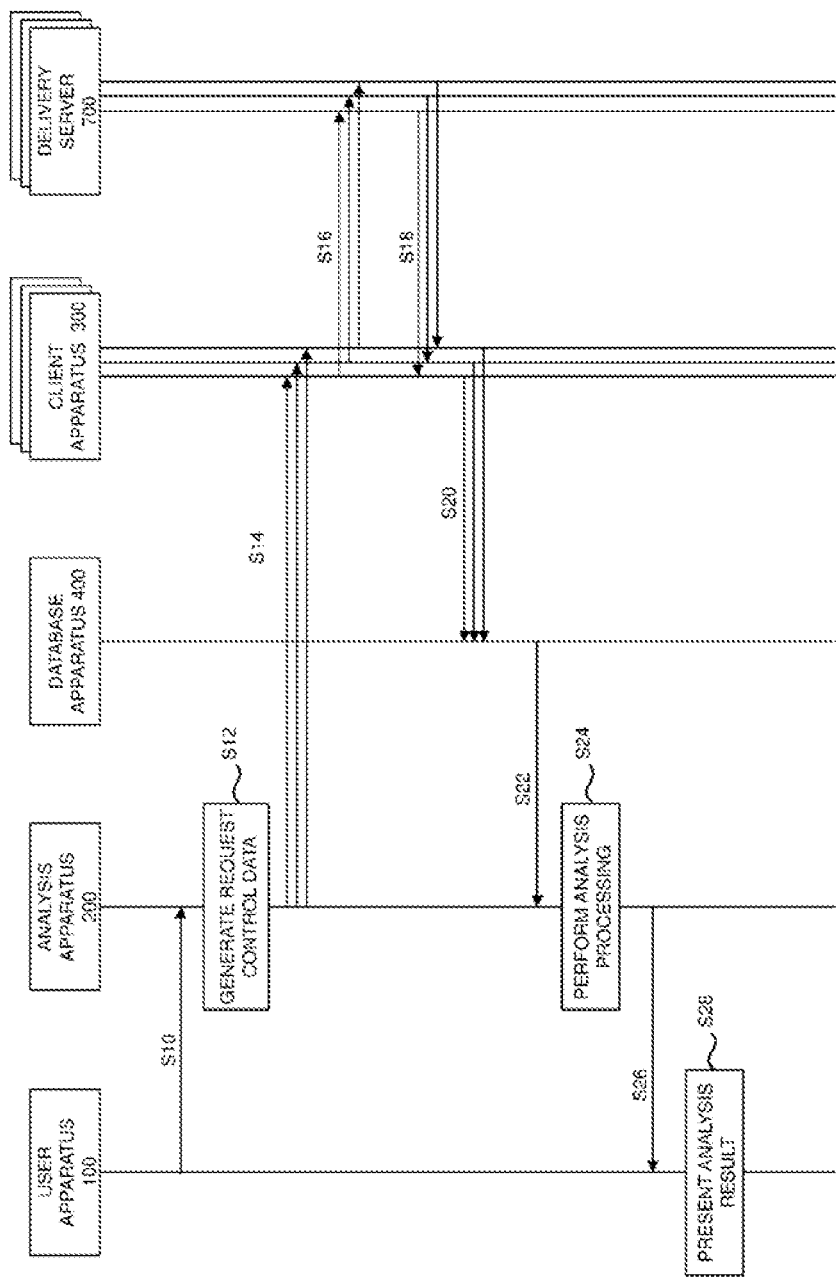
FIG. 7 is a sequence diagram illustrating analysis processing according to the first example embodiment of the present invention.

With reference to FIG. 7, an example of the analysis processing according to the first example embodiment of the present invention will be described. FIG. 7 is a sequence diagram illustrating a flow of the analysis processing according to the first example embodiment.

In Step S10, the input section 131 of the user apparatus 100 receives input data indicating an instruction from a user and supplies the input data to the instruction generation section 133. The instruction generation section 133 generates instruction data indicating an access instruction for each client apparatus 300 based on the input data, and sends the generated instruction data to the analysis apparatus 200.

FIG. 8 is an explanatory diagram illustrating the instruction data according to the present example embodiment. In the following, the "client" may be abbreviated as "CL" in each diagram. As illustrated in FIG. 8, the instruction data is data indicating, regarding each of the plurality of client apparatuses 300, a client ID, a client port number, a connection destination, a connection destination port number, request content a (for example, a Hyper Text Transfer Protocol (HTTP) request) indicating a target to be acquired or the like, and an expected difference. As illustrated in the diagram, the connection destination is identified by a domain name or an IP address. The expected difference represents a difference between reference data (for example, the original delivery data delivered by the origin server 710) and data expected to be acquired (for example, the delivery data cached in the cache server 720). Note that, in the present example, because the connection destination of the client apparatus 300 of client ID #0 is the origin server 710, a value indicating the expected difference is absent.

Note that it is only necessary that the instruction data generated by the instruction generation section 133 include an instruction for at least one client apparatus 300. It is preferable that the user instruct the client ID, the connection destination, and the expected difference for the user apparatus 100. It is preferable that a default value be set to item(s) in the instruction data not instructed by the user.

In Step S12, the input/output section 231 of the analysis apparatus 200 receives the instruction data from the user apparatus 100 (instruction generation section 133) and supplies the instruction data to the client control section 233. The client control section 233 generates request control data for each client apparatus 300, based on the supplied instruction data. The request control data is data including the items indicated by the instruction data, and is data enabling identification of a domain name corresponding to the CDN 600 to access or an IP address corresponding to one delivery server 700 to access for each of the plurality of client apparatuses 300. The request control data can include a Uniform Resource Identifier (URI), for example. Further details are given below.

FIG. 9 is an explanatory diagram illustrating the request control data according to the present example embodiment. As illustrated in FIG. 9, the request control data is data corresponding to a request for each of the plurality of client apparatuses 300, similarly to the instruction data. The request control data is data including a client IP address, a country/region of a client, a country/region of a connection destination, an IP address of the origin server 710, and request sending time, in addition to the items included in the instruction data. The client control section 233 generates the request control data by referring to the parameter 223 in the storage section 220, a system clock (not illustrated), and the like and adding the above items underlined in FIG. 9 to the instruction data.

Note that the country/region of a client and the country/region of a connection destination included in the request control data are pieces of information inferred from an IP address. As illustrated in the present example, a domain name may correspond to a plurality of IP addresses, and thus the country/region of a connection destination may not be identified in an entry whose connection destination is identified with a domain name. Note that, also in the entry whose connection destination is identified with a domain name, when the parameter 223 stores information associating the domain name and the country/region, the country/region of the connection destination may be identified from the domain name.

In Step S14, the client control section 233 of the analysis apparatus 200 sends the request control data generated in Step S12 to each of the plurality of client apparatuses 300. As can be understood from Steps S12 and S14 above, the client control section 233 controls each of the plurality of client apparatuses 300 so as to send a request (for example, an HTTP request) to the plurality of delivery servers 700, based on the instruction from the user.

In Step S16, the access section 331 of each client apparatus 300 sends the request to any one delivery server 700, based on the request control data sent from the analysis apparatus 200 (client control section 233). More specifically, when the request control data indicates a connection destination with a domain name, the access section 331 sends the request to the delivery server 700 indicated by an IP address converted according to name resolution using a DNS. In contrast, when the request control data indicates a connection destination with an IP address, the access section 331 sends the request to the delivery server 700 indicated by the IP address included in the request control data.

In Step S18, the delivery servers 700 send delivery data (for example, a Hyper Text Markup Language (HTML) file) in response to the request from the client apparatus 300. The access sections 331 of the client apparatuses 300 receive the delivery data sent from the delivery servers 700. FIG. 10 is an explanatory diagram illustrating the delivery data according to the present example embodiment. As illustrated in FIG. 10, the delivery data includes a header part and a body part.

In Step S20, the data accumulation section 333 of each client apparatus 300 sends the delivery data received by the access section 331 to the database apparatus 400 together with a parameter related to access. The database management section 431 of the database apparatus 400 stores, in the storage section 420, the delivery data and the parameter related to access sent from the client apparatuses 300 (data accumulation section 333) in a format that can be used as a relational database.

FIG. 11 is an explanatory diagram illustrating the data accumulated in the storage section 420 of the database apparatus 400 according to the present example embodiment. As illustrated in FIG. 11, in the storage section 420 of the database apparatus 400, the delivery data acquired by the client apparatuses 300 is stored in association with the parameter related to access included in the request control data.

Note that the IP address of the delivery server 700 is known after the client apparatus 300 accesses the delivery server 700. Thus, as illustrated in FIG. 11, regarding the connection destination specified with a domain name, the database management section 431 may further store the IP address returned from the DNS and the country/region of the connection destination.

In Step S22, the delivery data acquisition section 235 of the analysis apparatus 200 requests the database management section 431 of the database apparatus 400 to supply the delivery data and the parameter accumulated in the storage section 420 (for example, to send a query). The database management section 431 reads the delivery data and the parameter, based on the above request, and sends the delivery data and the parameter to the analysis apparatus 200.

In Step S24, the analysis processing section 237 of the analysis apparatus 200 performs the analysis processing by comparing the multiple pieces of delivery data and the parameter acquired by the delivery data acquisition section 235. In the present example, the analysis policy 221 specifies that the analysis processing section 237 compares the pieces of delivery data as to whether the pieces of delivery data match each other between the delivery servers 700. FIG. 12 is an explanatory diagram illustrating a result of the analysis processing according to the present example embodiment.

The analysis processing section 237 compares the delivery data of the origin server 710 acquired by the client apparatus 300 of client ID #0 (hereinafter referred to as "client #0"; the same applies to other client IDs) and the pieces of delivery data of the cache server 720 acquired by clients #1 to #3 according to the analysis policy 221, and thereby determines whether there is an actual difference. The above comparison processing may be performed using a diff command for comparing character strings, for example.

Then, based on the result of the analysis processing described above, the analysis processing section 237 outputs status information being a flag discretely indicating whether the delivery server 700 is in a normal status or an abnormal status. Detailed description is given in the examples below.

As illustrated in the column of the actual difference of FIG. 12, no difference is observed between the delivery data of the origin server 710 and the delivery data of the cache server 720 acquired by client #1. In contrast, a difference is observed between the delivery data of the origin server 710 and the delivery data of the cache server 720 acquired by client #2. The same applies to client #3 as well.

The expected difference between the delivery data of the origin server 710 and the delivery data of the cache server 720 acquired by client #1 is "absent". Regarding the cache server 720 accessed by client #1, the expected difference and the actual difference ("absent") match each other, and thus the analysis processing section 237 determines that the server is in the normal status, and outputs status information indicating "normal".

The expected difference between the delivery data of the origin server 710 and the delivery data of the cache server 720 acquired by client #2 is "present". Regarding the cache server 720 accessed by client #2 as well, the expected difference and the actual difference ("present") match each other, and thus the analysis processing section 237 determines that the server is in the normal status, and outputs status information indicating "normal".

The expected difference between the delivery data of the origin server 710 and the delivery data of the cache server 720 acquired by client #3 is "present". Regarding the cache server 720 accessed by client #3, the expected difference and the actual difference ("absent") do not match each other, and thus the analysis processing section 237 determines that the server is in the abnormal status, and outputs status information indicating "abnormal".

The analysis processing section 237 supplies the result of the analysis processing including the status information to the input/output section 231. The result of the analysis processing may include the data (the delivery data and the parameter acquired from the database apparatus 400) used for the analysis processing.

In Step S26, the input/output section 231 of the analysis apparatus 200 sends, to the user apparatus 100, the result of the analysis processing including the status information related to the delivery server 700 supplied from the analysis processing section 237.

In Step S28, the output section 135 of the user apparatus 100 presents the user with the result of the analysis processing sent from the analysis apparatus 200 (input/output section 231). More specifically, for example, the output section 135 may display a list including the delivery server 700 and the status information in a screen of a browser used by the user. The output section 135 may display a badge indicating the status information together with information of sites included in search results searched by the user using the browser. In addition, the output section 135 may distribute the result of the analysis processing including the status information as an RSS feed.

According to the configuration (in particular, the series of processing illustrated in FIG. 7) according to the present example embodiment described above, the status of the CDN 600 being a delivery system provided with the plurality of delivery servers 700 can be appropriately analyzed.

2.7. Example Alterations

The present example embodiment described above is altered in various forms. Specific aspects of such alterations are described below. Any two or more aspects selected from the above example embodiment and the following illustrated examples can be appropriately combined as long as those aspects are consistent with each other.

The status information in the above configuration is a flag discretely indicating whether the delivery server 700 is in a normal status or an abnormal status. In addition, based on the analysis policy 221, a continuous value probabilistically indicating whether the delivery server 700 is in a normal status or an abnormal status may be used as the status information. According to the above configuration, the user can quantitatively know degree of abnormality of the delivery server 700. On the other hand, according to the configuration in which the flag discretely indicating "normal" or "abnormal" is used as the status information as in the present example embodiment, the user can easily know degree of abnormality of the delivery server 700.

In the above configuration, the analysis processing section 237 of the analysis apparatus 200 determines whether the delivery server 700 is in the normal status or the abnormal status, based on the result of the analysis processing using pieces of delivery data. However, based on the analysis policy 221, the result of the analysis processing by the analysis processing section 237 may be directly output to the user apparatus 100. In this case, it is preferable that the analysis processing section 237 output, in the result of the analysis processing, information identifying a difference in the pieces of delivery data. The user apparatus 100 can present the user with a difference in a website, based on the information described above.

The analysis policy 221 in the above configuration specifies that the analysis processing section 237 compares the pieces of delivery data as to whether the pieces of delivery data match each other between the delivery servers 700. However, the analysis policy 221 may specify that the analysis processing section 237 compares the delivery data from the delivery server 700 and data expected to be acquired. In a configuration in which the plurality of delivery servers 700 do not completely synchronize with each other (for example, a configuration in which a different response is returned for each country), it is difficult to appropriately analyze the status of data delivery even if the origin server 710 and the cache server 720 are simply compared. According to the above configuration, data expected to be acquired and actual delivery data are compared for each delivery server 700, and therefore even in a configuration in which the plurality of delivery servers 700 do not completely synchronize with each other, the status of data delivery can be appropriately analyzed.

The analysis processing section 237 may implement the analysis processing by comparing past delivery data and current delivery data. In other words, the analysis policy 221 may specify that the analysis processing section 237 compares the delivery data acquired currently by the delivery data acquisition section 235 and the delivery data acquired in past by the delivery data acquisition section 235. According to the above configuration, the status of data delivery can be more appropriately analyzed through time-series comparison processing.

The status of data delivery may be analyzed by the analysis processing section 237 comparing a plurality of parameters related to access acquired from the plurality of delivery servers 700 for each item. For example, comparison processing may be implemented using vector operation, with a plurality of parameters related to access acquired from one delivery server 700 being considered as one vector. According to the above configuration, the analysis processing is performed also in consideration of elements other than the delivery data, and thus the status of data delivery can be more appropriately analyzed.

As can be understood from the above, the analysis apparatus 200 can flexibly change contents of the analysis processing by changing the analysis policy 221 stored in the storage section 220. Therefore, appropriate analysis processing depending on various situations can be implemented, as compared to a configuration in which algorithm for the analysis processing is fixed.

Note that the analysis apparatus 200 may be virtualized. In other words, the analysis apparatus 200 may be implemented as a virtual machine. In this case, the analysis apparatus 200 (the virtual machine) may operate as a physical machine (hardware) including a processor, a memory, and the like, and a virtual machine on a hypervisor. The same applies to the user apparatus 100, the client apparatuses 300, and the database apparatus 400 as well.

In a configuration in which the client apparatus(es) 300 is virtualized (that is, a configuration using virtual clients), it is preferable that each of a plurality of clients controlled by the client control section 233 access the delivery servers 700 via a relay node (for example, a proxy server) allocated a global IP address. It is difficult to freely allocate a global IP address to each client due to regional restrictions; however, with the use of the relay node, access sources (in other words, global IP addresses) for the delivery servers 700 can be adjusted.

The user apparatus 100 may be separated into an input user apparatus and an output user apparatus. It is more preferable to apply the above configuration to a configuration in which the result of the analysis processing is provided to a large number of user apparatuses.

The analysis apparatus 200 may perform the analysis processing, not based on the instruction of the user from the user apparatus 100. For example, based on the analysis policy 221, the processing of Step S12 and subsequent steps of FIG. 7 may be performed every predetermined period of time. The analysis apparatus 200 need not send the result of the analysis processing to the user apparatus 100. For example, the result of the analysis processing may be accumulated in the storage section 220, and used for control of the CDN 600.

3. Second Example Embodiment

Next, with reference to FIG. 13, a second example embodiment of the present invention will be described. The above-described first example embodiment is a concrete example embodiment, whereas the second example embodiment is a more generalized example embodiment.

3.1. Configuration of Analysis Apparatus 200a

Figure 13:
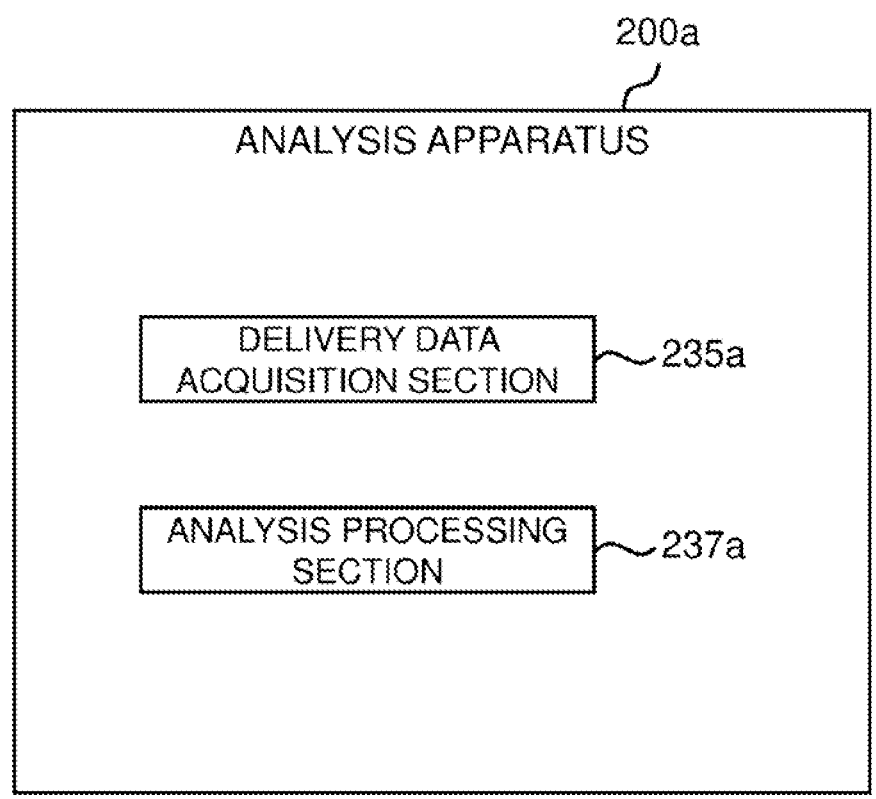
FIG. 13 is a block diagram illustrating a schematic configuration of an analysis apparatus 200a according to a second example embodiment of the present invention.

FIG. 13 is a block diagram illustrating a schematic configuration of an analysis apparatus 200a according to the second example embodiment. As illustrated in FIG. 13, the analysis apparatus 200a includes a delivery data acquisition section 235a and an analysis processing section 237a.

The delivery data acquisition section 235a and the analysis processing section 237a may each be implemented with one or more processors and a memory (for example, a non-volatile memory and/or a volatile memory) and/or a hard disk. The delivery data acquisition section 235a and the analysis processing section 237a may be implemented with the same processor, or may be implemented with different processors. The memory may be included in the one or more processors or may be provided outside the one or more processors.

3.2. Operation Example

An operation example according to the second example embodiment will be described. The analysis apparatus 200a (delivery data acquisition section 235a) acquires multiple pieces of delivery data delivered by a plurality of delivery servers provided in a delivery system. Next, the analysis apparatus 200a (analysis processing section 237a) performs the analysis processing by comparing the multiple pieces of delivery data acquired by the delivery data acquisition section.

Relationship with First Example Embodiment

As an example, the delivery data acquisition section 235a and the analysis processing section 237a included in the analysis apparatus 200a according to the second example embodiment may perform the operations of the delivery data acquisition section 235 and the analysis processing section 237 included in the analysis apparatus 200 according to the first example embodiment, respectively. In the case described above, description regarding the first example embodiment can also be applied to the second example embodiment. Note that the second example embodiment is not limited to the example described above.

According to the second example embodiment described above, the status of the delivery system provided with the plurality of delivery servers can be appropriately analyzed.

4. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be performed in time series in the order described in the corresponding sequence diagram. For example, the steps in the processing may be performed in an order different from that described in the corresponding sequence diagram or may be performed in parallel. Some of the steps in the processing may be deleted, or more steps may be added to the processing.

An apparatus including components (e.g., the client control section, the delivery data acquisition section, and/or the analysis processing section) of the analysis apparatus described in the Specification (e.g., one or more apparatuses (or units) among a plurality of apparatuses (or units) constituting the analysis apparatus or a module for one of the plurality of apparatuses (or units)) may be provided.

Similarly, an apparatus including the components (e.g., the input section, the instruction generation section, and/or the output section) of the user apparatus described in the Specification (e.g., a module for the user apparatus) may be provided. An apparatus including the components (e.g., the access section and/or data accumulation section) of each client apparatus described in the Specification (e.g., a module for the client apparatus) may be provided. An apparatus including the components (e.g., the database management section) of the database apparatus described in the Specification (e.g., a module for the database apparatus) may be provided.

Moreover, methods including processing of the components may be provided, and programs for causing a processor to perform processing of the components may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as, but not limited to, the following supplementary notes.

(Supplementary Note 1)
An analysis apparatus comprising:
a delivery data acquisition section configured to acquire multiple pieces of delivery data delivered by a plurality of delivery servers provided in a delivery system; and
an analysis processing section configured to perform analysis processing by comparing the multiple pieces of delivery data acquired by the delivery data acquisition section.

(Supplementary Note 2)
The analysis apparatus according to supplementary note 1, wherein
the analysis processing section is configured to perform the analysis processing according to an analysis policy specifying items to be compared in the analysis processing.

(Supplementary Note 3)
The analysis apparatus according to supplementary note 2, wherein
the analysis processing section is configured to output status information indicating a status of at least one of the delivery servers, based on a result of the analysis processing.

(Supplementary Note 4)
The analysis apparatus according to supplementary note 3, wherein
the status information is a flag discretely indicating whether a corresponding one of the delivery servers is in a normal status or an abnormal status, or a continuous value probabilistically indicating whether the corresponding one of delivery servers is in the normal status or the abnormal status.

(Supplementary Note 5)
The analysis apparatus according to any one of supplementary notes 2 to 4, wherein
the analysis policy specifies that the analysis processing section compares the multiple pieces of delivery data as to whether the multiple pieces of delivery data match each other.

(Supplementary Note 6)
The analysis apparatus according to any one of supplementary notes 2 to 4, wherein
the analysis policy specifies that the analysis processing section compares the delivery data and data expected to be acquired.

(Supplementary Note 7)
The analysis apparatus according to supplementary note 2, wherein
the analysis processing section is configured to output a result of the analysis processing.

(Supplementary Note 8)
The analysis apparatus according to supplementary note 7, wherein
the analysis processing section is configured to output information identifying, in the result of the analysis processing, a difference in the multiple pieces of delivery data.

(Supplementary Note 9)
The analysis apparatus according to any one of supplementary notes 2 to 8, wherein
the analysis policy specifies that the analysis processing section compares the delivery data acquired currently by the delivery data acquisition section and the delivery data acquired in past by the delivery data acquisition section.

(Supplementary Note 10)
The analysis apparatus according to any one of supplementary notes 1 to 9, wherein
the delivery system includes, as the plurality of delivery servers, at least one origin server and at least one cache server configured to cache the delivery data delivered by the origin server.

(Supplementary Note 11)
The analysis apparatus according to any one of supplementary notes 1 to 10, further comprising a client control section configured to control a plurality of clients to cause the plurality of clients to acquire the multiple pieces of delivery data from the plurality of delivery servers.

(Supplementary Note 12)

The analysis apparatus according to supplementary note 11, wherein each of the plurality of clients controlled by the client control section is allocated a global Internet Protocol (IP) address, or is configured to access any of the delivery servers via a relay node allocated the global IP address.

(Supplementary Note 13)

The analysis apparatus according to supplementary note 11 or 12, wherein the client control section is configured to control the plurality of clients to send a request to the plurality of delivery servers, based on an instruction from a user.

(Supplementary Note 14)

The analysis apparatus according to any one of supplementary notes 11 to 13, wherein the client control section is configured to identify, for each of the plurality of clients, a domain name corresponding to the delivery system to access, or an IP address corresponding to one of the delivery servers to access.

(Supplementary Note 15)

An Analysis Method Comprising:

acquiring multiple pieces of delivery data delivered by a plurality of delivery servers provided in a delivery system; and performing analysis processing by comparing the multiple pieces of delivery data acquired.

(Supplementary Note 16)

A program causing a computer to operate as:

a delivery data acquisition section configured to acquire multiple pieces of delivery data delivered by a plurality of delivery servers provided in a delivery system; and an analysis processing section configured to perform analysis processing by comparing the multiple pieces of delivery data acquired by the delivery data acquisition section.

INDUSTRIAL APPLICABILITY

A status of a delivery system provided with a plurality of delivery servers can be appropriately analyzed.

REFERENCE SIGNS LIST

S1 Analysis System
100 User Apparatus
200 Analysis Apparatus
233 Client Control section
235 Delivery Data Acquisition section
237 Analysis Processing Section
300 Client Apparatus
400 Database Apparatus
600 CDN (Delivery System)
700 Delivery Server
710 Origin Server
720 Cache Server

What is claimed is:

1. An analysis method performed by an analysis apparatus and comprising:

receiving first delivery data transmitted over a network by a first delivery server of a plurality of delivery servers of a content delivery network (CDN);

receiving second delivery data transmitted over the network by a second delivery server of the plurality of delivery servers, the first delivery data having a same content as a content included in the second delivery data;

comparing the first delivery data and the second delivery data to determine a difference between the first delivery data and the second delivery data, according to an analysis policy specifying items to be compared; and performing analysis processing by identifying whether the second delivery server is in a normal status or an abnormal status based on whether there is the difference between the first delivery data and the second delivery data.

2. An analysis apparatus comprising:

a memory storing instructions; and one or more processors configured to execute the instructions to:

receive first delivery data transmitted over a network by a first delivery server of a plurality of delivery servers of a content delivery network (CDN);

receive second delivery data transmitted over the network by a second delivery server of the plurality of delivery servers, the first delivery data having a same content as a content included in the second delivery data;

compare the first delivery data and the second delivery data to determine a difference between the first delivery data and the second delivery data, according to an analysis policy specifying items to be compared; and perform analysis processing by identifying whether the second delivery server is in a normal status or an abnormal status based on whether there is the difference between the first delivery data and the second delivery data.

3. The analysis apparatus according to claim 2, wherein the one or more processors are configured to execute the instructions to output status information indicating a status of at least one of the delivery servers, based on a result of the analysis processing.

4. The analysis apparatus according to claim 3, wherein the status information is a flag discretely indicating whether a corresponding one of the delivery servers is in the normal status or the abnormal status, or a continuous value probabilistically indicating whether the corresponding one of delivery servers is in the normal status or the abnormal status.

5. The analysis apparatus according to claim 2, wherein the analysis policy specifies that the first delivery data are compared to the second delivery data to determine whether the first delivery data and the second delivery data match each other.

6. The analysis apparatus according to claim 2, wherein the analysis policy specifies that the first delivery data and data expected to be acquired are compared.

7. The analysis apparatus according to claim 2, wherein the one or more processors are configured to execute the instructions to output a result of the analysis processing.

8. The analysis apparatus according to claim 7, wherein the one or more processors are configured to execute the instructions to output information identifying, in the result of the analysis processing, the difference between the first delivery data and the second delivery data.

9. The analysis apparatus according to claim 2, wherein the analysis policy specifies that the first delivery data acquired currently and the second delivery data acquired in past are compared.

10. The analysis apparatus according to claim 2, wherein the delivery system includes, as the plurality of delivery servers, at least one origin server and at least one cache server configured to cache the first delivery data delivered by the at least one origin server.

11. The analysis apparatus according to claim 2, wherein the one or more processors are further configured to execute the instructions to control the plurality of client apparatuses to cause the plurality of client apparatuses to acquire the first delivery data and the second delivery data from the plurality of delivery servers.

12. The analysis apparatus according to claim 11, wherein each of the plurality of client apparatuses is allocated with a global Internet Protocol (IP) address, or is configured to access any of the delivery servers via a relay node allocated with the global IP address.

13. The analysis apparatus according to claim 11, wherein the one or more processors are configured to execute the instructions to control the plurality of client apparatuses to send a request to the plurality of delivery servers, based on an instruction from a user.

14. The analysis apparatus according to claim 11, wherein the one or more processors are configured to execute the instructions to identify, for each of the plurality of client apparatuses, a domain name corresponding to the delivery system to access, or an IP address corresponding to one of the delivery servers to access.

15. A non-transitory computer readable recording medium storing a program causing one or more processors to:
receive first delivery data transmitted over a network by a first delivery server of a plurality of delivery servers of a content delivery network (CDN);
receive second delivery data transmitted over the network by a second delivery server of the plurality of delivery servers, the first delivery data having a same content as a content included in the second delivery data;
compare the first delivery data and the second delivery data to determine a difference between the first delivery data and the second delivery data, according to an analysis policy specifying items to be compared; and
perform analysis processing by identifying whether the second delivery server is in a normal status or an abnormal status based on whether there is the difference between the first delivery data and the second delivery data.

\* \* \* \* \*